(12) United States Patent
Ha

(10) Patent No.: US 6,827,328 B2
(45) Date of Patent: Dec. 7, 2004

(54) OIL CONTROL VALVE

(75) Inventor: Chang-Yoon Ha, Ansan (KR)

(73) Assignee: Hyundai Motor Company, Seoul (KR)

( * ) Notice: Subject to any disclaimer, the term of this patent is extended or adjusted under 35 U.S.C. 154(b) by 140 days.

(21) Appl. No.: 10/235,600

(22) Filed: Sep. 4, 2002

(65) Prior Publication Data

US 2003/0047698 A1 Mar. 13, 2003

(30) Foreign Application Priority Data

Sep. 11, 2001 (KR) .......................... 2001-55884

(51) Int. Cl.[7] .............................................. F16K 31/00
(52) U.S. Cl. ................ 251/64; 251/129.15; 137/625.65
(58) Field of Search ............................. 251/64, 129.15; 137/625.65

(56) References Cited

U.S. PATENT DOCUMENTS

| | | | |
|---|---|---|---|
| 1,049,845 A | 1/1913 | Geissinger | |
| 5,236,173 A | 8/1993 | Wakeman | |
| 6,029,704 A | * | 2/2000 | Kuroda et al. .......... 137/625.65 |

FOREIGN PATENT DOCUMENTS

| | | |
|---|---|---|
| DE | 2010904 | 9/1971 |
| DE | 3132396 | 8/1981 |
| DE | 3147219 | 6/1983 |
| DE | 228017 | 1/1984 |
| DE | 9014763 U | 4/1992 |
| DE | 19600351 | 7/1997 |
| DE | 19611886 | 10/1997 |
| DE | 19953936 | 12/2000 |
| JP | 08-247327 | 9/1996 |

* cited by examiner

*Primary Examiner*—Edward K. Look
*Assistant Examiner*—John K. Fristoe, Jr.
(74) *Attorney, Agent, or Firm*—Morgan Lewis & Bockius LLP

(57) ABSTRACT

An oil control valve is provided that comprises a housing, a spool movably disposed inside the housing, and a damping unit disposed between a distal end of the spool and an end wall of the housing such that an impact generated by a collision of the spool at the end of its travel decreases.

4 Claims, 1 Drawing Sheet

OIL CONTROL VALVE

FIELD OF THE INVENTION

The present invention relates to an oil control valve, and more particularly, to an oil control valve for controlling operation of a camshaft in a continuously variable valve timing system.

BACKGROUND OF THE INVENTION

Generally, operation of a camshaft in a continuously variable valve timing system is controlled by oil pressure, and an oil control valve regulates a supply of oil which controls the operation of the camshaft.

The oil control valve includes a housing, a spool disposed inside the housing, a return spring for elastically supporting the spool, and a magnetic coil for producing a magnetic field. The spool is activated by a magnetic force of the magnetic field. By regulating current supplied to the magnetic coil, the operation of the spool can be regulated.

Hydraulic oil that contains foreign particles circulates within the oil control valve, so the oil control valve gathers such particles, and these particles have bad effects on the operation of the oil control valve. In order to eliminate such particles that remain inside the oil control valve, an oil control valve cleaning mode is periodically performed.

During the oil control valve cleaning mode, the spool that is disposed inside the housing of the oil control valve endures full reciprocal movements so that the particles are broken into smaller particles by the collision between the spool and an end wall of the housing. The smaller particles are discharged from the housing through an opening hole formed in the housing, and they are then trapped by an oil filter.

During such a cleaning mode, the spool collides with the end wall of the housing, and therefore noise occurs. In order to reduce such noise, that is, in order to prevent the spool from colliding with the housing, it is necessary to have a minimum gap between the housing and the spool such that collision does not occur. The gap can be determined by trial and error, and the operation of the spool is regulated according to the gap. However, such a method requires a long period of time. Furthermore, because resistance of the magnetic coil varies according to temperature, intensity of the magnetic field also varies according to temperature. Thus, the operation of the spool is affected by temperature so that collision between the spool and the housing even after regulation of the operation of the spool occurs intermittently. Moreover, if the spool moves at a high speed, a resonance may occur between the spool and the return spring so that the oil control valve may be damaged by the collision between the spool and the housing.

SUMMARY OF THE INVENTION

In a preferred embodiment of the present invention, the oil control valve comprises a housing, a spool, and a damping unit. The spool is movably disposed inside the housing, and the damping unit is disposed between a distal end of the spool and an end wall of the housing such that an impact generated by a collision of the spool at the end of its travel decreases.

It is preferable that the damping unit comprises an elastic spacer and a stopper. The elastic spacer is disposed in contact with the end wall of the housing, and the stopper is disposed in contact with the spacer, the stopper being provided with an opening hole formed therethrough.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
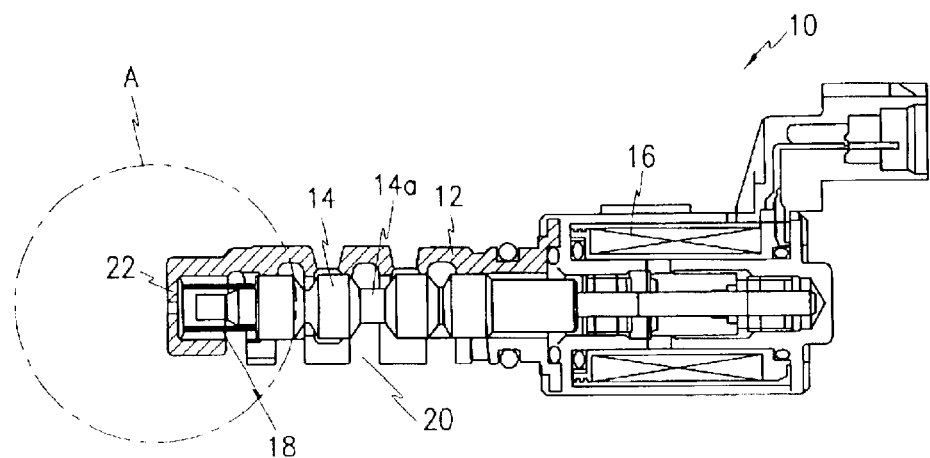
FIG. 1 is a sectional view of a oil control valve according to a preferred embodiment of the present invention.

As shown in FIG. 1, the oil control valve 10 according to the present invention comprises a housing 12, a spool 14 movably disposed inside the housing 12, a magnetic coil 16 for generating a magnetic force to move the spool 14, and a return spring 18 for providing a return force to the spool 14. Other means for actuating and moving the spool may be employed, e.g., hydraulic means.

The return spring 18 is disposed between the spool 14 and an inner wall of the housing 12. The magnetic coil 16 is supplied with electrical power, and it generates a magnetic field. If the spool 14 is disposed in the magnetic field of the magnetic coil 16, the spool 14 is forced to move by a magnetic force. The housing 12 is provided with a plurality of ports 20 through which oil is supplied or exhausted. A plurality of grooves 14a are formed on the spool 14 in order to change the route of the oil.

Figure 2:
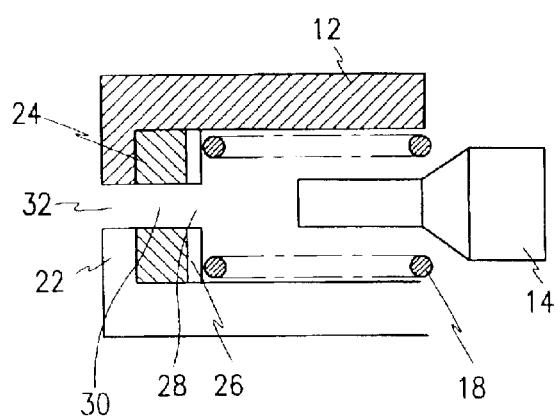
FIG. 2 is an enlarged view of region A of FIG. 1.

The oil control valve 10 according to the present invention comprises a damping unit inside the housing 12. As shown in FIG. 2, the damping unit includes an elastic spacer 24 which is disposed in contact with an end wall 22 of the housing 12, and a stopper 26.

The stopper 26 is disposed in contact with the spacer 24, and a hole 28 is formed at the center thereof, through which oil is exhausted. The spacer 24 and the end wall 22 are respectively provided with holes 30 and 32 at positions corresponding to hole 28.

The spacer 24 is preferably made of an elastic material such as rubber, etc., and it is adhered to the stopper 26 which stops the spool 14 at the end of its travel. Therefore, although the spool 14 collides with the stopper 26, the impact is absorbed by the elastic spacer 24 so that the noise is substantially decreased. Furthermore, because the spacer 24 acts as a damper, it prevents the resonance of the return spring 18.

The operation of the oil control valve will be described hereinafter.

Some particles that are contained in the oil remain inside the oil control valve 10. These particles may accumulate near the end wall 22 by the reciprocal movement of the spool 14. The operation of the spool is disturbed by accumulated particles, and in particular, maximum advance of the spool 14 during its operation can be limited.

In order to eliminate such particles, the spool is regulated to undergo a maximum displacement such that one end of the spool 14 contacts the stopper 26. Therefore, the particles are broken into smaller particles, and then exhausted. When the spool 14 collides with the stopper 26, the impact is dampened by the elastic spacer 24 so that the noise decreases.

As stated above, in the oil control valve according to the present invention, the spacer absorbs the impact generated by the collision between the spool 14 and the stopper 26, and prevents the resonance between the spool 14 and the return spring 18.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An oil control valve, comprising:
    a housing defining a plurality of port, including an oil exhaust hole at one end;
    a valve spool slideably disposed in said housing and cooperating with said ports to control oil flow;
    an actuator acting on the spool;
    a damping unit disposed in the housing, around said oil exhaust hole; and
    a biasing element disposed between said damping unit and said spool acting in opposition to said actuator.

2. The oil control valve of claim 1, wherein said damping unit comprises:
    an elastic spacer disposed against the housing having a hole therethrough communicating with said oil exhaust hole; and
    a stopper adjacent to the elastic spacer, opposite the housing, said stopper having a hole therethrough communicating with the oil exhaust port and spacer holes.

3. The oil control valve of claim 2, wherein an end of the biasing element bears against said stopper.

4. An oil control valve, comprising:
    a housing defining a plurality of ports, including an oil exhaust port positioned near one end of said housing;
    a valve spool slideably disposed in said housing and cooperating with said ports to control oil flow;
    an actuator acting on said valve spool;
    a damping unit disposed in said housing, said damping unit positioned near said oil exhaust port; and
    a biasing element disposed between said damping unit and said valve spool acting in opposition to said actuator.

* * * * *